United States Patent [19]

Martin

[11] Patent Number: 4,466,064
[45] Date of Patent: Aug. 14, 1984

[54] MULTIPROCESSOR COMPUTER SYSTEM FOR EXECUTING A SPLITTABLE ALGORITHM, NOTABLY A RECURSIVE ALGORITHM

[75] Inventor: Alain J. Martin, Eindhoven, Netherlands

[73] Assignee: U.S. Philips Corporation, New York, N.Y.

[21] Appl. No.: 527,375

[22] Filed: Aug. 29, 1983

Related U.S. Application Data

[63] Continuation of Ser. No. 262,570, May 11, 1981, abandoned.

[30] Foreign Application Priority Data

May 14, 1980 [NL] Netherlands ................. 8002787

[51] Int. Cl.³ .............................. G06F 15/16
[52] U.S. Cl. ................................. 364/200
[58] Field of Search ..................... 364/200, 900

[56] References Cited

U.S. PATENT DOCUMENTS

| | | | |
|---|---|---|---|
| 3,287,702 | 11/1966 | Borck et al. | 364/200 |
| 3,582,899 | 3/1968 | Semmelhaack | 364/200 |
| 3,815,095 | 6/1974 | Wester | 364/200 |
| 3,970,993 | 7/1976 | Finnila | 364/200 |
| 4,065,808 | 12/1977 | Schomberg et al. | 364/200 |
| 4,174,514 | 11/1979 | Sternberg | 364/200 |
| 4,270,169 | 5/1981 | Hant et al. | 364/200 |
| 4,270,170 | 5/1981 | Reddaway | 364/200 |
| 4,330,882 | 5/1982 | Dodson | 364/200 |
| 4,378,588 | 3/1983 | Katzman et al. | 364/200 |
| 4,384,273 | 5/1983 | Ackland et al. | 364/900 |

Primary Examiner—Charles E. Atkinson
Assistant Examiner—Michael R. Fleming
Attorney, Agent, or Firm—Jack E. Haken; James J. Cannon, Jr.

[57] ABSTRACT

A multiprocessor computer system having a two-dimensional array of modules. Each module comprises two source connections for an activation signal for an algorithm, a program memory, a processor element and two destination connections for an activation signal for a corresponding algorithm. The processor element can split the task of a recursive algorithm into two partial tasks (of the same algorithm) or can execute an elementary partial task of this algorithm. The results of the partial tasks are returned in the direction wherefrom the relevant activation signal originated. For this purpose, each module in the array is connected to four neighboring modules. The peripheral modules are not only connected to at least two neighboring modules, but also to at least one module on an opposite side of the array. In each module there is one central process and for each connection there is one channel process, the central process communicating only with the channel processes of the relevant module. The latter processes provide the communication between the various modules.

10 Claims, 19 Drawing Figures

SEND (on channel x in node N):

N.P[x] := true;

N!.Q[x] $\overset{ext}{:=}$ true;

<u>wait</u> N.Q[x];

FIRESEND;

N.Q[x] := false;

N.P[x] := false

SELECT (on a set S of channels, in N'):

A x in S : N'.P[x] := true;

wait E A in S : N'.Q [A];

N'.Q[A] := false;

N.Q[A] :=^{ext} true;

FIRE SELECT;

A x in S : N'.P[x] := false

```
01  CP[x]::
02    {initially a ≠ b}
03    do a ≠ b → skip od;
04    cycle { RECEIVE: }
05            if BUF[x].f1 = SIGNAL →
06                id := BUF[x].f2;
07                y,z := alloc(i,j);
08                if z = * → { it is a new node }
09                    "initiate new node i,j at address y"
10                ☐ z ≠ * → { it is not a new node } skip
11                fi ; M[y.Δ +q] := true { signal is performed };
12            ☐ BUF[x].f1 ≠ SIGNAL →
13                v(i2(x)); p(i1(x));
14            ☐ BUF[x] = NIL → skip
15            fi ;
16            a := ¬ a; do a = b → skip od;
17            { SEND: } p(O1(x));
18            if full → full := false;
19                a := ¬ a; do a ≠ b → skip od; v(O1(x))
20            ☐ ¬ full → BUF[x] := NIL;
21                a := ¬ a; do a ≠ b → skip od; v(O1(x))
22            fi
23    end cycle            FIG.11c
```

```
procedure   FIRE RECEIVE (l:length; A:start address; x:channel);
begin       ll := 0;
            do  ll < l-1  →  p(i2(x)); A[ll] := BUF[x].f2; v(i1(x));
                             ll := ll+1
            od
end                         FIG.11d
```

```
procedure   FIRE SEND (l:length; A:start address; x:channel);
begin       ll := 0;
            do  ll < l-1  →  p(O1(x));
                             BUF[x] := < param, A[ll] >;
                             full := true; v(O1(x));
                             ll := ll+1
            od
end                         FIG.11e
```

```
procedure   FIRE SIGNAL  (x:channel);
begin       ii, jj := next (x, cur i, cur j);
            { from the id. pair of the current node: cur,i cur j,
              the pair ii.jj of the neighbournode is computed }
            p(O1(x));
            BUF[x] := < signal, (ii,jj) >;
            full := true; v(O1(x))
end
initially:  O1(x) = 1
            i1(x) = i2(x) = 0        FIG.11f
```

MULTIPROCESSOR COMPUTER SYSTEM FOR EXECUTING A SPLITTABLE ALGORITHM, NOTABLY A RECURSIVE ALGORITHM

This is a continuation of application Ser. No. 262,570, filed May 11, 1981, now abandoned.

BACKGROUND OF THE INVENTION

The invention relates to a multiprocessor computer system for executing a splittable algorithm, notably a recursive algorithm, on input data, comprising an at least mainly functionally filled array of modules which are functionally arranged in n columns ($n \geq 2$) and p rows ($p \geq 2$). A recursive algorithm is an algorithm which is executed in a recursive procedure. A procedure p{xi, yj} which acts on input quantities (xo . . . xi) in order to generate output quantities (yo . . . yj) is termed recursive if the same procedure is called again within the body of the procedure, for example, in the form of p̂{x(i−m), yk} where (i−m)>/0. The execution of the procedure thus called may often constitute a partial task of a simpler structure which then forms a part of the result of the original algorithm. The procedure can be called two or more times within the same procedure, so that the overall task to be executed thereby is split into a number of partial tasks. Splitting can be performed a number of times in succession, until finally one or more elementary partial tasks are formed and executed, the result being used in a preceding stage of the series of splits and so on all the way back to where of the original algorithm was presented. It has been found that many algorithms can be advantageously split into partial tasks. The following split is given by way of example.

$$\binom{n}{k} = \frac{n!}{(n-k)!k!} = \binom{n-1}{k} + \binom{n-1}{k-1}$$

It will be clear that the splitting can be continued, subject to $k>1$ (where implicity always $n \geq k$). Other algorithms of a recursive nature are, for example, matrix multiplications and sorting mechanisms. The splitting into partial tasks can often be performed according to a successive two-fold branching. The execution is accelerated when a separate processing unit is reversed for each elementary partial task. It is a drawback that the number of processors then required is very large, because this number must be adapted to the most extensive form of the algorithm (in the above example this is determined by the largest permissible value of n). A further problem occurs in that the interconnecting paths between the processors may become extremely long in the case of an exponentially branching network, or in that the array on, a planar carrier is very inhomogeneous, because the number of processors increases exponentially in the successive levels of the splitting pattern.

SUMMARY OF THE INVENTION

It is an object of the present invention to provide an array for a multiprocessor computer system in order to solve the described problem, offering the following advantages: a task of an algorithm which is to be executed in a processor can be split therein into two or more partial tasks (for the same algorithm), each of which can be applied to a relevant further processor for further calculation, the end result ultimately formed being applied to the original processor again, the total number of partial tasks thus formed not being subject to any restriction imposed by the limited number of processors or modules in the array: in principle an infinite binary tree can be mapped on the array, while there are also provided means for counteracting an accumulation of tasks in a single module. The objects in the accordance with the invention are realized in that each module comprises:

(a) a first source connection (COML) for receiving a first activation signal annex parameter signal for an algorithm and for despatching a result signal of said algorithm;

(b) a second source connection (COMU) for receiving a second activation signal annex parameter signal for an algorithm and for despatching a result signal of said algorithm;

(c) a memory element for the storage of program signals of at least one procedure which can be selectively activated by an activation signal in order to split the task of an associated, splittable algorithm into two partial tasks and to combine the results of the partial tasks, upon reception, to form the result of said task or, as the case may be, to execute an elementary partial task of said algorithm;

(d) a processor element for receiving said program signals and parameter signals and for alternatively forming said partial tasks or, as the case may be, for combining the results to be received, or for executing said elementary partial task and for producing a result signal;

(e) a first destination connection (COMR) for despatching a third activation signal annex parameter signal of a first partial task of said algorithm thus formed and for receiving a result signal of said first partial task;

(f) a second destination connection (COMD) for despatching a fourth activation signal annex parameter signal of a second partial task of said algorithm, formed together with said first partial task, and for receiving a result signal of said second partial task, at least one module as access module of the entire array comprising a further source connection for receiving an external activation signal annex parameter signal for an algorithm and for supplying a result signal of said algorithm, the first destination connection of the modules being connected to the first source connection of the next module in the same row, the first destination connection of all last modules of the rows being each time connected to the first source connection of the first module of a respective row and vice versa, the second destination connection of the modules being connected to the second source connection of the next module in the same column, the second destination connection of all last modules of the columns being connected each time to the second source connection of the first module of a relevant column and vice versa. Such a binary tree is known from the well known Graph theory.

The functions of the splitting of the task of an algorithm into partial tasks and the combining of the results of the partial tasks in order to form the result of the algorithm are performed each time in a module: the execution of this process implies the implementation of a "node" of the tree (binary or of a higher order) in the relevant module. As a result of the described configuration of the array of the modules and the end-around coupling of destination connections and source connections, a tree of arbitrary dimensions can be mapped on the array. Each module can accommodate a number of modes. This number is limited only because a module has a given finite storage capacity. The nodes implemented in a module can be "active" or "non-active". In a simple module, at the most one node will be active. The array can comprise nxp modules, but also fewer modules. The latter may be the case, for example, when a module is defective: communication then takes place with the next module, provided that the relevant connections are present. It may also be that a given module is not implemented, for example, due to lack of space on a printed circuit board. It is alternatively possible for a number or even all modules of the array to be accommodated in a single integrated circuit. For example, of an array with n=p=4, one or two modules may be absent or defective. However, as the array is less completely filled, the distribution of tasks is also less favorable. In the foregoing, array is to be understood to mean the functional arrangement. The geometrical arrangement may be completely different.

Preferably, the first destination connection of the last modules of the rows (1 ... p) is each time connected to the first source connection of the first modules of the rows (j+1, j+2, ... p, 1 ... j), the second destination connection of the last modules of the columns (1, 2, ... n) being connected each time to the second source connection of the first modules of the columns (k+1, k+2, ... n, 1, ... k). A more systematic configuration of the array is thus obtained by the cyclically organized end-around coupling.

Preferably, the array comprises (nxp) modules, k being zero and the numbers (p+j) and n not having a common factor. It has been found that the mapping of the graph on the array of modules is thus very systematic. In many algorithms, given partial tasks occur repeatedly with the same parameter values. For example $$\binom{n}{k} = \binom{n-1}{k} + \binom{n-1}{k-1} =$$

$$\binom{n-2}{k} + 2 \cdot \binom{n-2}{k-1} + \binom{n-2}{k-2}.$$

In this configuration of the array, the central term of the right member always has to be calculated in only one module. Similarly, the partial task has to be performed only once for every pair of values $$\binom{n-v}{k-w}.$$

However, for the execution of other algorithms a systematic configuration of the array is very useful.

Preferably, p=n. This results in a compact array.

Preferably, each module comprises means for separately implementing a central process and each time a channel process per said connection thereof, and also for making said central process communicate exclusively with the channel processes of the relevant module, the channel processes realizing the entire communication between the various modules, the splitting of the task, the combining of the results of the partial tasks and the execution of an elementary partial task being performed entirely by the central process. As a result of such a configuration, the processing (splitting, recombination, execution of elementary partial task) can be readily separated from the communication processes between different modules. A module can thus also receive a message for a node which is not active at a given instant, without disturbing the node then being executed by the central process. The implementation of different processes in a single processor is known per se.

Preferably, each module comprises means for adding an indication to a message formed therein by a central process, said indication having a first value which indicates that the message acts exclusively as a quantity message for the node active in a receiving module, and a second value which indicates that the message acts exclusively as an activation message for the node in a receiving module which is identified by way of an indication incorporated in the body of the message. This results in a simple organization of the quantity messages: a quantity is to be understood to mean a data which is necessary for the further execution of the program of a node. For example, a quantity message can be applied directly to the memory of the module (because the relevant node is active) and the message need not be buffered. On the other hand, a non-active node can thus also be simply activated. The actual activation of a node, of source, is realized by the central process of the receiving module.

Preferably, under the control of said first value a communication path is established between two parts of the memories of the associated modules then assigned to two communicating nodes. This results in fast communication without risk of congestion due to two or more conflicting message paths. A generalization of the "stack mechanism" is thus obtained.

Preferably, each of such coupled channel processes comprises:

(g) first signalling means (P(x)) for the signalling per said connection, by way of a first state to an other module of a despatch of a message desired by said first module via said connection, or the reception thereof, a second state of said means acting, with the exclusion of further states, as a rest state after the completion of said despatch or reception;

(h) second signalling means (Q(x)), having a first state in order to be set itself to said first state in the case of a despatch desired by another module via said connection after the formation therein of the first state of said first signalling means, and a second state which acts as an "active" state after the detection of the latter first state, and in order to be set itself to the first state in the case of reception desired via said connection by another module after the formation of the latter "active" position by said other module, the second state acting as a rest state after completion of said reception. This results in a safe communication procedure.

BRIEF DESCRIPTION OF THE FIGURES

A preferred embodiment of the invention will be described in detail hereinafter, that is to say: the structure of the network, the functional co-operation between the modules, the construction of a standard module and of the access module, and the program organization of a module. This description will be given with reference to the following figures:

FIG. 5 shows a momentary activation condition of the modules for the FIGS. 1 and 3, FIG. 6 shows a momentary activation condition of the modules for the FIGS. 2 and 3, FIG. 9 shows a flowchart for a transmitting module during a communication operation;

FIG. 10 shows a flowchart for a receiving module, and

FIGS. 11a–11f show a number of partial operations of a module in a higher programming language.

DESCRIPTION OF THE PREFERRED EMBODIMENT

The Structure of the Network of Modules

Figure 1:
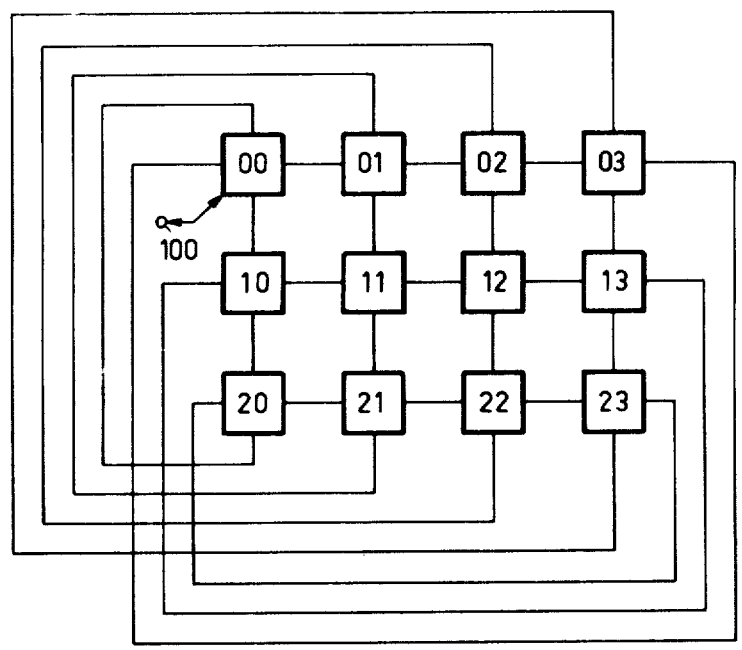
FIG. 1 shows a network of 3×4 modules.

FIG. 1 shows a network of 3×4 modules. The numbers 3 and 4 are prime to each other. An arbitrary module, in this case the module "00", acts as the access module and comprises to this end a source connection 100 for receiving an external activation signal annex parameter signal for an algorithm. The module 00 in the network shown comprises two destination connections which are connected to a source connection of the modules "01" and "10". The module "01" comprises two destination connections which are connected each time to a source connection of the two modules "02" and "11". Module "22" comprises two destination connections which are connected to a source connection of the modules "23" and "02" and so on. In the module "00", the task of the relevant algorithm can be split (in a manner yet to be described) into two partial tasks relating to the same algorithm, unless the original task was an elementary task which cannot be split. This elementary character is determined by the value of the one (or more) prevailing parameter signal. However, if the task can be split, an activation signal for the partial task or parameter signal is applied from the module "00" to the modules "10" and "01", in order to be treated therein in the same way as the original algorithm in the module "00". Thus, the module 10 can activate the modules 20 and 11, the module 01 can activate the modules 11 and 02, etc. When an elementary partial task is activated, it is executed and the relevant result signal is returned to the module where the partial task was formed in order to be combined with the result of any further partial tasks. Finally, the result of the task of the original algorithm appears in the module "00" in order to be applied to the environment. The environment may be realized, for example, as a computer for which the device shown in FIG. 1 forms a special extension.

Figure 2A:
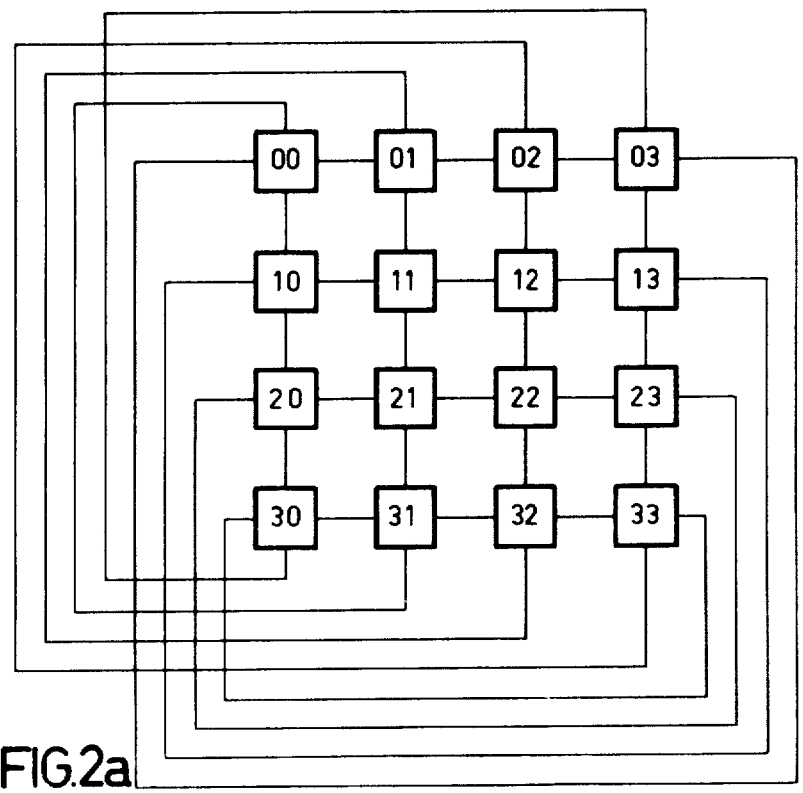
FIGS. 2a, 2b, 2c show three further networks of modules.

FIG. 2a shows a network of 4×4 modules. The end-around coupling of the modules of one row is realized in the same way as in FIG. 1. However, the columns are coupled end-around in a staggered manner; for example, the module 32 is connected to the module 01. This is an advantageous method of end-around coupling when the number of rows and columns of the array is the same, or when these numbers have a common factor as will be described with reference to FIG. 6. When the columns are numbered in a manner ascending from left to right, the second destination connection of the last module of the columns 1, 2, . . . n will be connected to the second source connection of the first module of the columns k+1 . . . n, 1 . . . k successively. The value of n will then be equal to 4 and the value of k will be equal to 1. Such staggering can also be realized between the rows, and also for rows and columns simultaneously. The structures of the FIGS. 1 and 2 topologically correspond to a torus. Congestion will thus not readily occur. The networks shown in the FIGS. 1, 2 may comprise other numbers of rows and columns; alternatively, more than one access module may be present. Furthermore, given modules may be absent. For example, if the module 12 is absent in FIG. 1, the modules 11/13 or 02/22 may be directly interconnected. If the module 23 is absent, both destination connections of the modules 22 and 13 must be coupled end-around. In given cases the end-around coupling of the peripheral modules may be less systematic, so that for example, in FIG. 1 the pairs of modules 00/03, 10/23 and 20/13 are interconnected. The systematic interconnection, however, often offers a more uniform distribution of the load of the (partial) tasks over the network of modules.

Figure 2B:
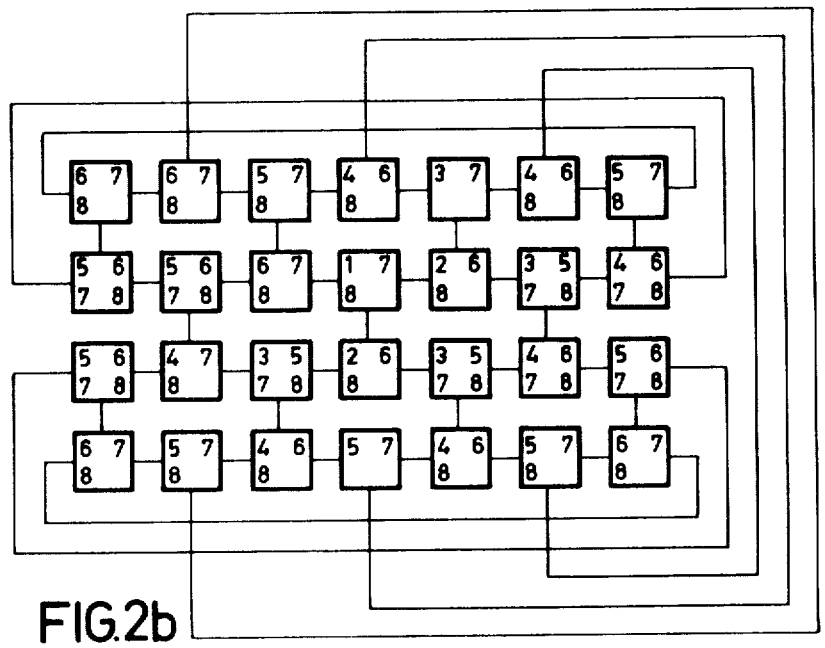

FIG. 2b shows a network of 28 modules. Each module comprises three connections in the network which are all suitable for use in two directions: they can act as a source connection or as a destination connection. When a module receives a task, the task is split into partial tasks, if necessary. The partial tasks are despatched via the two connections other than the one via which the original task has been received. The digits indicate the levels of the splitting pattern. The original task is indicated as "1", the successive levels as "2", "3". . . etc. It will be clear that for each successive level a larger number of modules will be activated (until they all participate at the level "9").

Figure 2C:
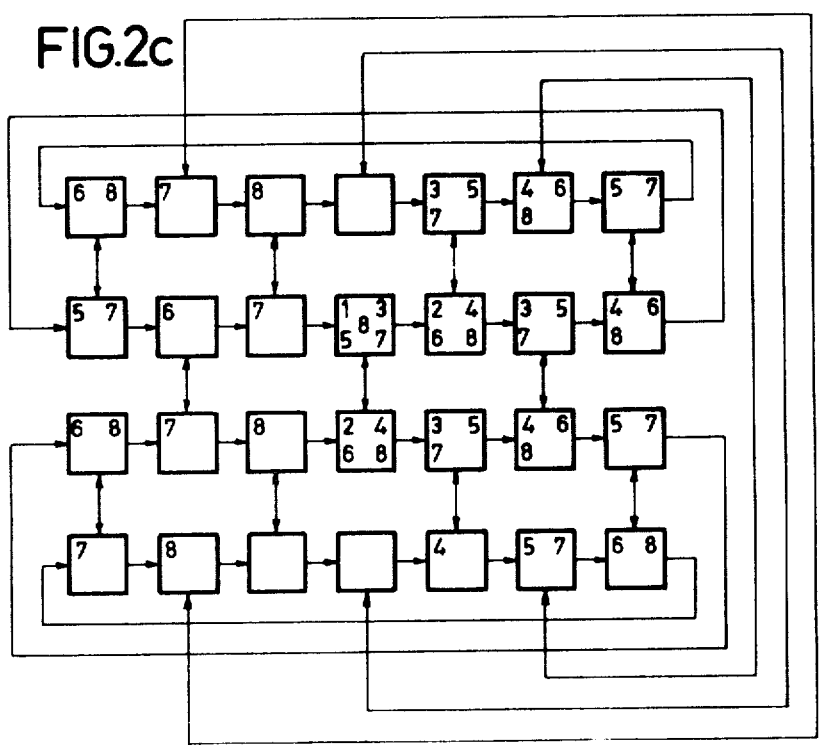

FIG. 2c shows a further network of 28 modules. Each module comprises three connections. The connections to the rows act in one direction. The connections to the columns act in two directions. When a module receives a task, the task is split, if necessary; the partial tasks are despatched via the two destination connections available. The digits again denote the level in the splitting pattern. The increase of the number of modules active at each successive level is slower than in FIG. 2b.

The Functional Cooperation Between the Modules

Figure 3:
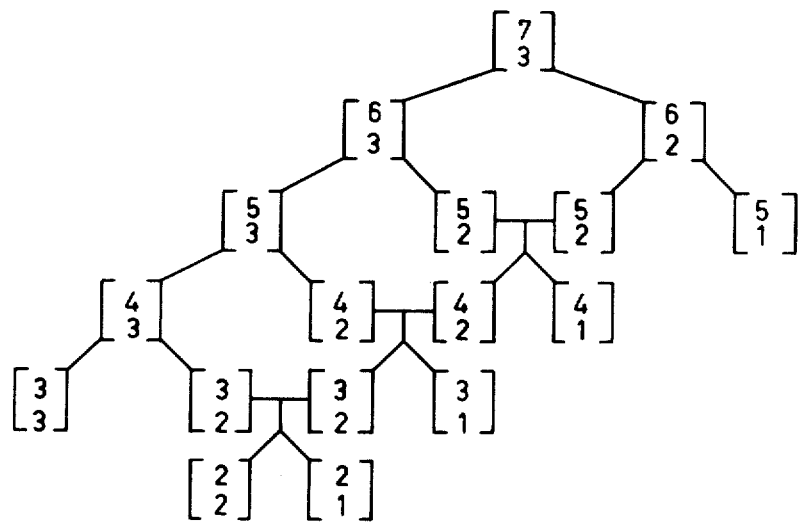
FIG. 3 shows a pattern for splitting the tasks of an algorithm into partial tasks.

FIG. 3 shows a splitting pattern for an algorithm, that is to say the previously mentioned algorithm for calculating $$\binom{n}{k}.$$

It is assumed that there are two kinds of elementary partial algorithms, i.e. algorithm for determining $$\binom{j}{j} \text{ and } \binom{j}{i}.$$

Obviously, it is alternatively possible to treat $$\binom{j}{i}$$

in further split partial algorithms. The partial algorithms for $$\binom{5}{2}, \binom{4}{2} \text{ and } \binom{3}{2}$$

are found twice in this tree, so that the results also have to be used twice for processing in a partial algorithm of higher rank. For example, in FIG. 1 it may be that the module 00 performs the splitting of $$\binom{7}{3},$$

the module 10 performs the splitting of $$\binom{6}{3},$$

the module 20 performs the splitting of $$\binom{5}{3}$$

and the module 00 performs the splitting of $$\binom{4}{3}$$

again, so that at that instance two nodes of the binary tree are implemented in the module 00. In many cases the former node will be in a waiting state during the splitting of $$\binom{4}{3}.$$

Figure 4:
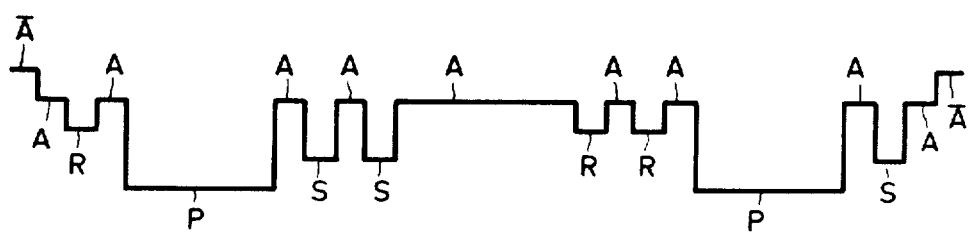
FIG. 4 shows the associated sequence of the functions of a module.

In this respect, FIG. 4 shows an example of a sequence of the functions to be performed in a module for a given algorithm. The module is not active at the left in this time diagram (at $\overline{A}$). At a given instant, an activation signal is received, with the result that the relevant node is created (A). This means that in the module a given amount of storage space is reserved, for example, for state variable of the node, signal bits for controlling the communication, intermediate results. During the parts denoted by A, another node (if present) can become active in the relevant module instead of the node for which the procedure is depicted. Therefore, A only means that the relevant node can be activated. Subsequently, at R one or more parameter signals are received and, if necessary, an identification signal for the algorithm if several different algorithms are programmed in the relevant module. It is not necessary per se to perform this receive operation as an indivisible operation; it can also be performed in parts, in which case another node may become active during an intermediate time interval. In the system shown in FIG. 3, a node to be implemented thus can be created "twice" as if it were by two nodes of next-higher order. The first receive operation is then two-fold. The relevant nodes need not be synchronized and the reception of the associated parameter signals may take place in an arbitrary part of the further procedure. After the first reception, a rest interval may occur again. A part of the algorithm is then executed, notably the part where the task of the algorithm is split into two partial tasks (P). Subsequently, an activation signal annex parameter signal (S, S) is applied to each of two nodes of next-lower rank. This is followed by a longer interval during which nodes of lower rank perform the partial tasks, possibly utilizing further splits (A). Subsequently, the results of the partial tasks arrive in the relevant node, (R, R), possibly separated by an interval A which is longer than indicated, because the further nodes activated are not in synchronism, or because the further activated modules have to execute mutually different numbers of operations. During the subsequent interval P, the results of the partial tasks are combined in order to generate the result of the originally called algorithm. This result is despatched (S) to the node which generated the original (partial) task (may also be two nodes). Finally, the relevant node is cancelled ($\overline{A}$, the reserved storage space thus being released. If the task of an algorithm is split into more than two partial tasks, the sequence of the intervals P, R, S is more complex. For example, in the case of three partial tasks it is RPSSSRRRPS, R being the receive operation, S the despatch or send operation, and P the processing operation.

Figures 5, 6:
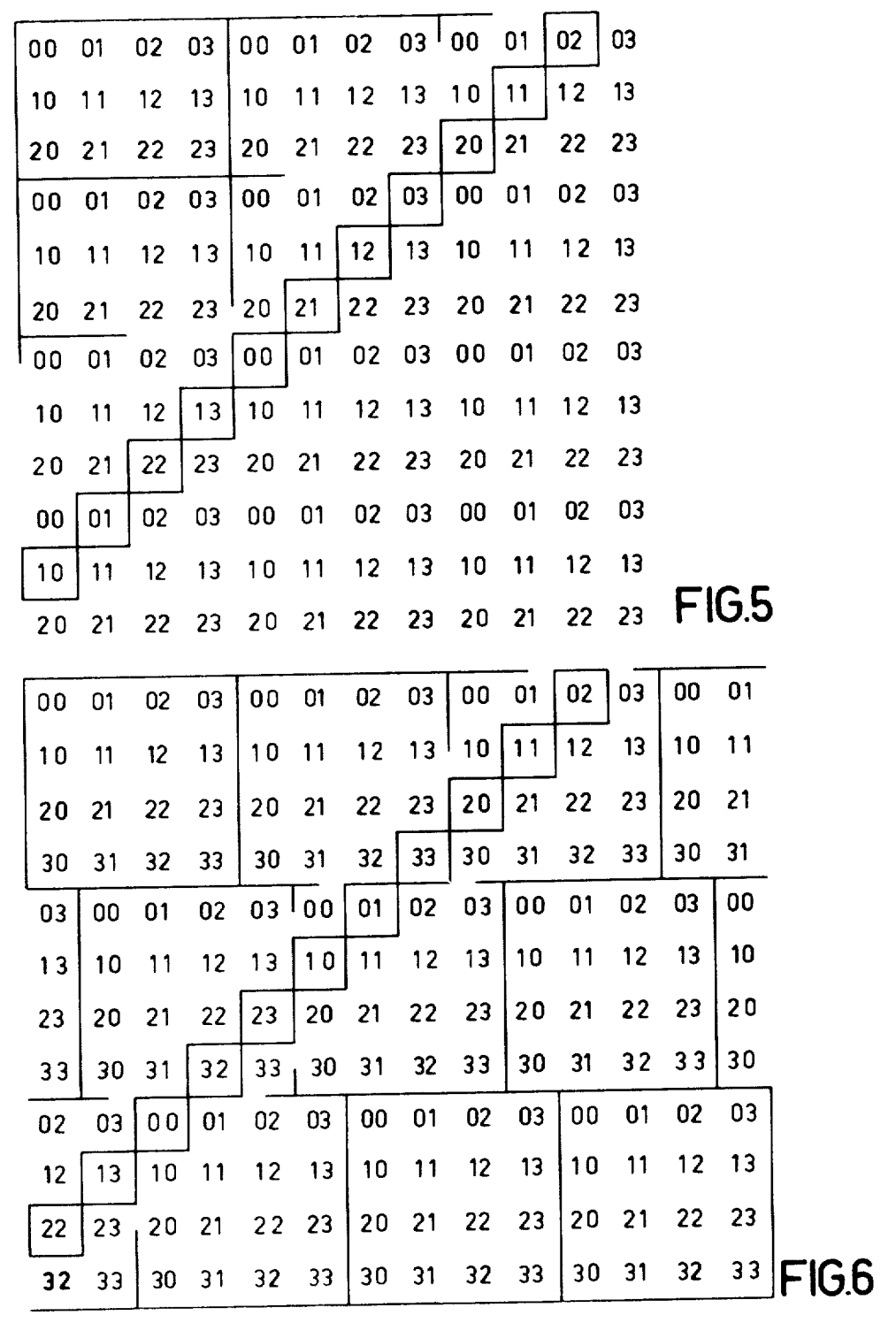

FIG. 5 shows a momentary activation state of the modules for the FIG. 1, it being assumed that the same amount of time is necessary for each execution of the splitting of a task. Each module of the arrangement is represented a number of times (only by its number). The tasks of the algorithm are split and the partial tasks are passed on to the modules which adjoin the splitting module at the right and the bottom. Given modules receive the same task twice; however, this task is executed only once. The modules thus execute their (partial) tasks in synchronism. The modules which are active at a given instant thus form a diagonal. One example of such a diagonal is given, starting at the bottom left with the module 10 and extending as far as the module 02 at the upper right. Eleven of the twelve modules are then simultaneously engaged in executing one of the operations associated with one of the nodes. Because this number is comparatively large, the processing can be comparatively quickly carried out, even in the case of a very complex algorithm. Obviously, if the splitting into partial tasks is not symmetrical, the processing requires more time because more nodes have to be implemented. In accordance with FIG. 3, the total number of nodes (including those in which no splitting into partial algorithms is performed) equals 14. In an asymmetrical case, where each partial task must be separately executed (no multiple use), the number of partial tasks to be executed would be: 21 (1+2+4+6+6+2). In the case of splitting into three or more, the number of nodes generally is also larger: the combination possibility for different nodes shown in FIG. 3 may then also occur.

FIG. 6 is similar to FIG. 5, but relates to the array shown in FIG. 2. According to this array, the two partial tasks are delegated to the modules which are present at the right of and underneath the module in which the splitting is executed in the figure; for example, from module 33 to the modules 02 and 30. A complete pattern of all 16 modules is each time shown in a framed block. Like in FIG. 5, a diagonal of simultaneously active modules is shown, extending from "22" at the bottom left to "02" at the top right. This diagonal comprises eleven mutually different modules, so that again a large number of modules can be simultaneously active: the processing speed is thus comparatively high. The systematic set-up of the FIGS. 1, 2 therefore, offers advantages in some cases, but a different set-up of the interconnection pattern of the modules at the edges may also be advantageous.

THE CONSTRUCTION OF A MODULE

Figure 7:
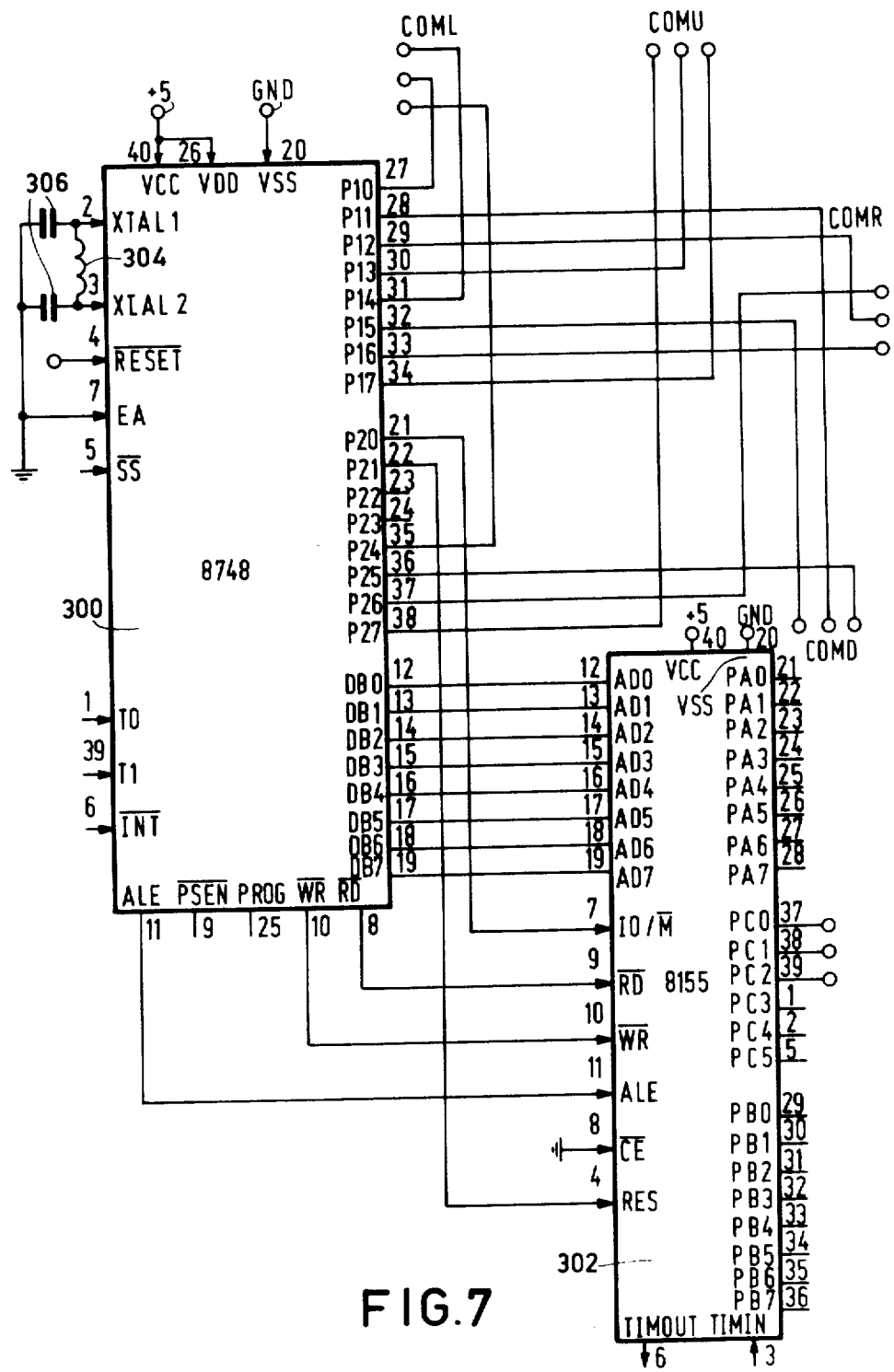
FIG. 7 shows a realization of one module in the form of a block diagram.

FIG. 7 shows an embodiment of a module which can be used in FIG. 1 for all modules, with the exception of the access module "00". The module comprises two integrated circuits, i.e. a microcomputer 300 of the type INTEL 8748 or INTEL/SIGNETICS 8048 and an input/output memory annex input/output element 302 of the type INTEL 8155 (INTEL corp., Santa Clara, Cal., and described in the book INTEL MCS-48 family of single-chip microcomputers-User's manual). The difference between the two microcomputers consists exclusively of the fact that the first microcomputer is electrically (re)programmable, while the second is not. For the construction and details concerning the set of instructions, reference is also made to the book "8048 Microcomputer User's Manual", published by the manufacturer, Signetics Corporation, 811 East Arques Avenue, Sunnyvale, Cal. 94086, in cooperation with N. V. Philips' Gloeilampenfabrieken, Eindhoven, the Netherlands (1978).

The element 300 is powered +5 Volts via connection pins 40/26 and is connected to ground by way of pins 20 (CSS) and 7(EA). The internal clock frequency is adjusted to a correct value by means of a small coil 304 of 47 µH and two capacitors of 22 pF on the terminals 2/3. Due to manufacturing tolerances, this clock frequency exhibits some spread, but for the described choice it is in any case within the limits permissible for the relevant module. However, the modules do not operate synchronously, but this is not objectionable as has already been mentioned. In a different set-up, a central clock could be used so that all modules could operate in mutual synchronism. The microcomputers of all modules can be simultaneously reset to a starting position by an external signal "0" applied to the pin 4. The pins 1, 5, 6, 9, 23, 24, 25 and 39 are not used, because they carry (not shown) a fixed signal voltage "0" or "+5 volts".

The microcomputer comprises four connections for communication with other modules, i.e. COML (left, pins 35, 27, 31), COMD (down, pins 36, 28, 31), COMR (right, pins 37, 29, 33) and COMU (up, pins 38, 30, 34). The pins 35 to 38 thereof are reserved for the data transport and the other two pins of each threesome control the organization of the handshake. On said pins, belonging to the "gates" 1 or 2, the microcomputer comprises an attractive facility for quasi-bidirectional data transport. For the sake of brevity, reference is made to the manufacturer's documentation for the technical details thereof. The pins 12-19 are connected to the internal data bus and are suitable for reading and writing under the control of a signal on the read/write control pins 8/10. On the pins 21, 22 further control signals can appear for the element 302. Finally, on the pin 11 a signal "address latch enable" can appear for activating an address write operation. This is necessary to enable addresses and data to be successively applied to the element 302. The functionally important elements of the microcomputer 300 are an 8-bit central processor unit, an 1k bytes program (EPROM) memory, and a 64 bytes read/write memory.

The element 8155 is a read/write memory which, moreover, has inter alia an input/output function and a capacity of 256 bytes which can thus be addressed by 8 address bits. Via pins 12 to 19, this memory is connected to the microcomputer 300. The read/write signal can be received on the terminals 9/10; on terminal 11 the control signal can be received for filling the address triggers with an address. Furthermore, on pin 7 a selection signal can be received for selection from the memory and input/output modes and on terminal 4 a reset signal can be received for activating an initial position. On pin 40 5 volts can be received, and on pin 20 ground potential. The pins 37-39 are reserved for receiving a three-bit selection signal in order to enable a selection from several algorithms, if desired. In the algorithm given by way of example, the remaining storage capacity was found to be so small that the implementation of several, different algorithms was abandoned. For the extension of the memory capacity, reference is made to the documentation issued by the manufacturer.

The selection from several different algorithms can also be performed by way of the program: each transmitted message should then contain, for example, an indication for the algorithm for which it is intended. In that case, a plurality of algorithms can also be simultaneously executed: in principle the first algorithm need not be completed before the second algorithm is started by application to an access module.

Pin 8 is connected to ground for continuous activation. The pins 1, 2, 3, 5, 6 and 21 up to and including 36 are not used. The described module can receive an activation signal annex parameter signal on one or on both connections COML, COMU, so that a procedure to be executed is addressed in the program memory (in the element 300). The module can send an activation signal annex parameter signal on one or on both connections COMR, COMD. The results travel in the opposite direction (directions).

The Construction of the Access Module

Figure 8:
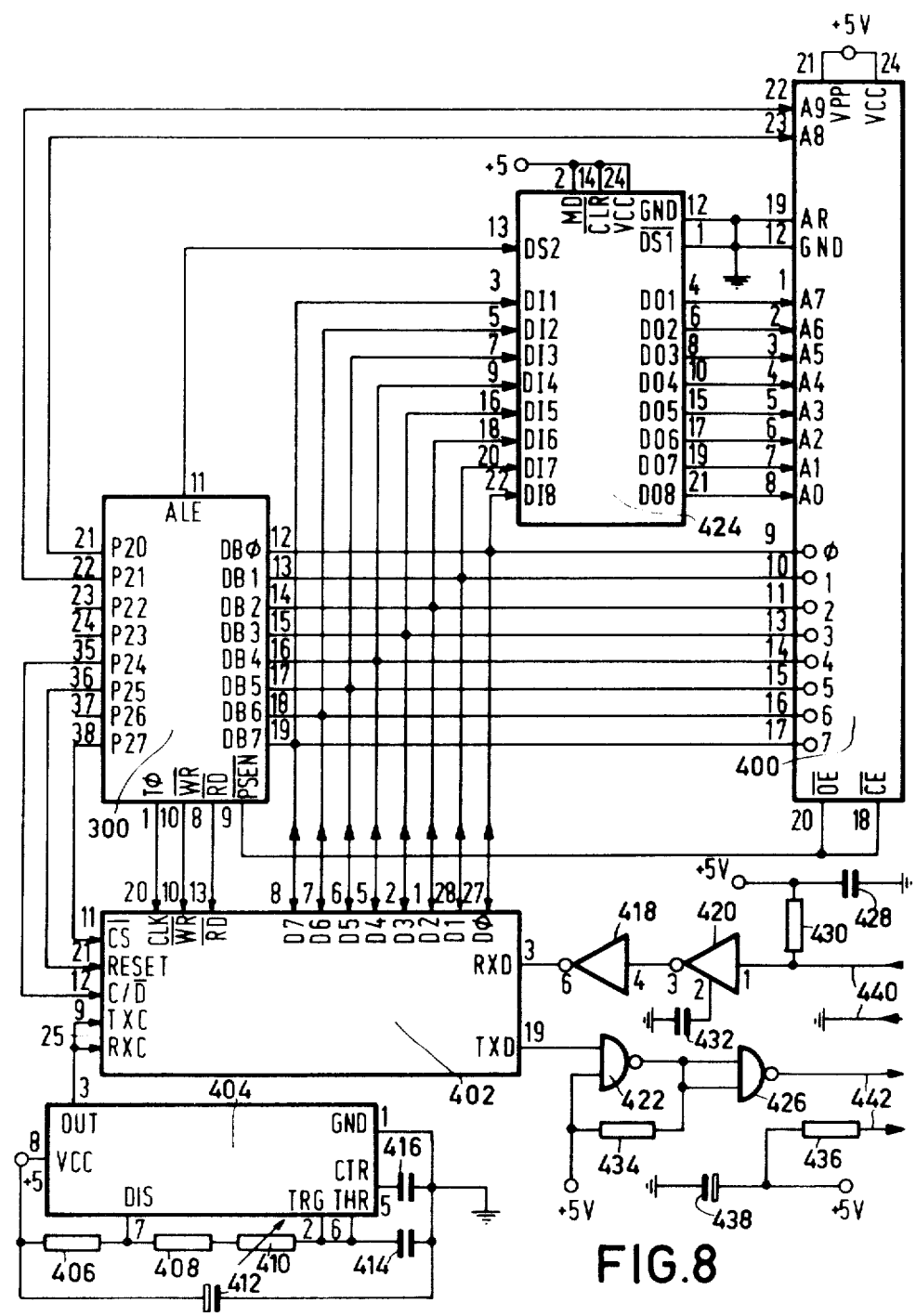
FIG. 8 shows an extension of FIG. 7 in order to realize an access module.

FIG. 8 shows an embodiment of an access module. Several access modules may in principle be present. It is alternatively possible for all modules of the network to receive information simultaneously, for example, program information, so that they also have given access facilities. Like in FIG. 7, this module comprises a microcomputer of the type 8748 or 8048 (element 300). For a major part of the connections, reference is made to the FIG. 7; herein, only the modifications with respect to the previous figure are shown. The storage capacity of the program memory of the module 300 is not sufficient for the input/output functions, so that a module 400 of the type INTEL 2758 is added. This is a PROM memory having a capacity of 1024 bytes of 8 bits. The ten address bits A0 to A9 can be received on the terminals 8 . . . 1, 22, 23. The connections for the data bits O0 to O7 are formed by the pins 9, 10, 11, 13 . . . 17. The pins 21 and 24 are connected to a 5-volt power supply; the pins 19, 12 are connected to ground potential. An enable signal can be received on the interconnected pins 18 ($\overline{CE}$) and 20 ($\overline{OE}$). Since it acts as a read-only memory, the element 400 outputs only data bytes to the microcomputer 300 and is connected to the data bus in the same manner as the element 302. For the temporary storage of the eight least-significant address bits there is provided an 8-bit input/output gate 402 of the type 8212 which internally comprises latch circuits. This is because, contrary to the element 8155, the module 2758 does not have a facility for the internal storage of the entire address. The input pins DI1-DI8 are connected to the data connection. The pins 2(MD), 14 ($\overline{CLR}$) and 24 (VCC) are connected to a potential of +5 volts, the pins 1($\overline{DS1}$) and 12 (GND) being connected to ground. Pin 13 (DS2) can receive an enable signal (Address Latch Enable, ALE) from the microcomputer. The further source connection of the access module is realized via the element 402 of the type INTEL 8251 and can thus be connected to the environment. This element 8251 is programmable interface unit for communication. In this example it serves to enable an exchange of serial information with a so-called Teletype unit which is not shown for the sake of brevity. The pins 27, 28, 1, 2, 5, . . . 8 serve for the transport of the actual data. Pin 26 is connected to a power supply source of 5 volts, the pins 4 (GND), 17 ($\overline{CTS}$) and 22 ($\overline{DSR}$) being connected to ground potential. Terminal 10 receives a signal $\overline{WR}$ and terminal 13 receives a signal $\overline{RD}$ from the microcomputer 300; furthermore, terminal 20 receives the clock signal CLK derived from pin 1 (T0) of the microcomputer, pin 11 receives an enable signal ($\overline{CS}$) derived from pin 38 (P 27) of the microcomputer, pin 12 receives a selection signal "control/data" (C/$\overline{D}$) derived from the pin 35 of the microcomputer, and pin 21 receives a reset signal (RESET) derived from pin 36 (P 25) of the microcomputer. An external oscillator 404 of the type SE555 which determines the bit frequency is connected to the pins 9 ($\overline{TXC}$) and 25 ($\overline{RXC}$). This oscillator is connected in the manner shown via resistors 406 (8, 25 kohms), 408 (39 kohms) and 410 (10 kohms) and the capacitors 412 (2.2 μF), 414 (8.2 nF) and 416 (10 nF). Pin 19 (T×D) of the element 402 is used as a serial data output and pin 3 (R×D) is used as a serial data input. The inverters 418, 420 form part of a module of the type MC 1489A, with Vcc=+5 volts and GND=0 volts. The NAND-gates 422, 426 form part of a module of the type SN 7438. The other parts have the following values: 428: 10 nf; 430: 1000 ohms; 432: 470 pF; 434: 1000 ohms; 436: 220 ohms, ¼ W; 438: 10 μF (tantalum). The connections 44 are the inputs from the Teletype unit; the connections 442 are the outputs to the teletype unit. For the connections 440, the equivalence of the teletype is an open/closed switch. A further solution consists in that the inverter 418 is eliminated and the lower connection of "440" is connected to −5 volts (instead of to ground potential). For the connection 442, the equivalence of the teletype is a coil. A further solution consists in that the element 422 is eliminated and the relevant inputs of the element 426 are connected to terminal 19 of element 402 and, via resistor 434, to +5 volts.

The following modifications occur in the access module with respect to the circuit shown in FIG. 7:

Element 300:

pin 35 to pin 7 of element 302 and pin 12 of element 402; pin 36 to pin 21 of element 402 and pin 4 of element 302; pin 37 to pin 8 of element 302; pin 38 to pin 11 of element 402; pins 21, 22 to pins 22, 23, respectively, of element 400; pins 23, 24 are not used. In element 302, the following pins are used differently: pin 25 is used as the data pin for the connection COML, and the pins 26, 27, 28 are used similarly for the connections COMD, COMR, COMU, respectively.

In the present embodiment, the access module has the functions of a "normal" module plus the function of adaptation to the environment. This adaptation can also be implemented in a separate device. The only difference between the access module and the other modules then consists in an additional connection besides COML, COMU, COMP, COMD. One of these connections may even be double-acting, for example, COML, by way of a built-in branch.

A Program Organization of a Module.

The general organization of a module has been described with reference to the FIGS. 7, 8. If contrary to the simple solution of FIG. 7, it should be possible to execute several algorithms which are not known in advance, each module should contain a residential "load program". This program is activated either by a general reset signal (terminal 4 of element 300 in FIG. 7) or by the fact that an incoming message comprises an activation indication for the load program. The technique of the loading of a program is well known per se. In this case, it is realized according to a modification of FIG. 4, i.e. in a sequence: RS(S). The program is thus received (R) and transmitted (S) to a first and, if necessary, to a second module. However, each module has to receive the program only once. The residential load program then controls the organization according to which the processing program is stored.

During the execution of the algorithm, a number of nodes are implemented in the described manner. For the sake of simplicity, each node is assigned a unique identification which is composed, for example, of the two associated parameter signals in the example of FIG. 3: the node for calculating, for example $$\binom{21}{5}.$$

then has the indication "0521").

The further nodes communicating with these nodes are easily obtained therefrom: the partial tasks are executed by the nodes "0420" and "0520", and the results generated in "0521" are applied to the nodes "0522" and "0622" (obviously only if and in an as far as these two nodes are implemented in the algorithm).

The available storage space in a module is assigned to a node as follows. First of all, a part is required for the load program (RAM or ROM). Furthermore, a part is required for the operation of the module itself, so that it can change over from node to node and synchronize the communication processes (RAM or ROM). An amount of storage capacity is also required for instructions of the application program. In this program can be loaded, a RAM memory is concerned; this memory contains inter alia an indication as to how much storage space (RAM) is required for each node, i.e. space for intermediate results, for the name of the node, an instruction counter register word, jump indication for indicating the node whereto a jump must be made, etc. The memory of a module also contains an address table which indicates the addresses at which the various nodes are stored. Initially, all elements of this table will be empty.

Such an organization utilizing a segment table is known per se.

The program structure of a module comprises a number of cooperating sequential processes. A standard article concerning such processors is called "Cooperating Sequential Processes" by E. W. Dijkstra, in "Programming languages", F. Genuys ed; Academic Press, New York, 1968, which describes all sorts of levels of interaction in order to avoid internal blocking of the process. Per module there are five processes in the embodiment:

(a) the central process which performs the activities of the various nodes, each time at the most only one node being active;

(b) for each of the four connections (COML, COMU, COMR, COMD) a channel process which controls the actual communication between the nodes of the various modules. Per connection a half-duplex data transport is possible. It will also be understood that in the present embodiment two different nodes within the module can never directly communicate with each other.

Each channel process communicates with the associated central process by way of binary semaphore quantities (signal bits) and by means of known p and v operations on these quantities (see the article by Dijkstra).

Figures 9, 11A:
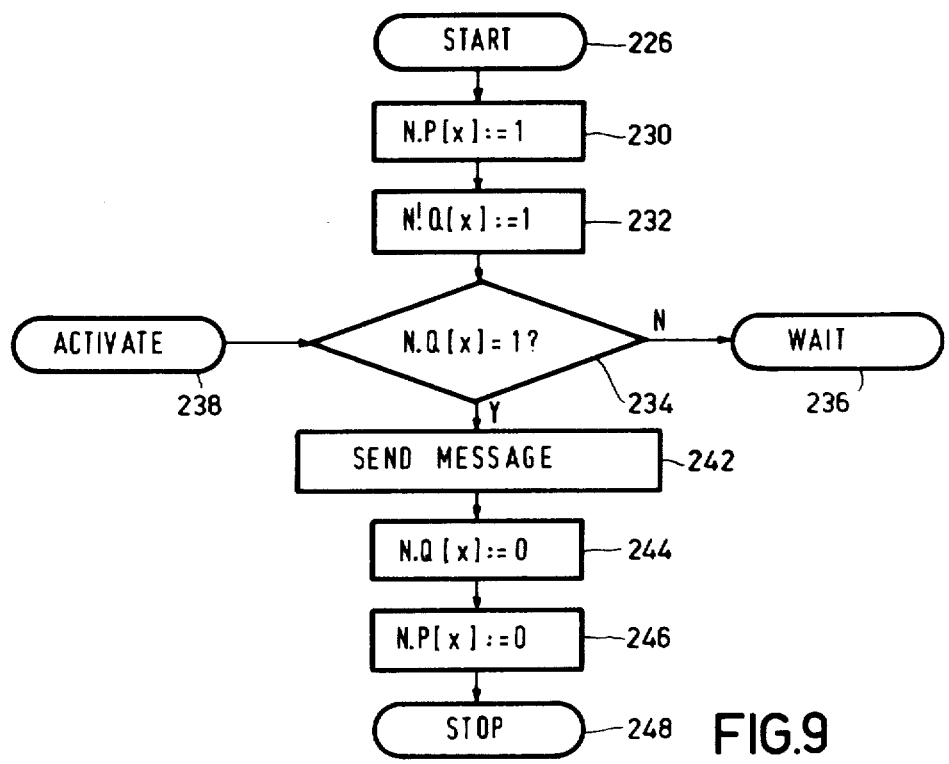

Hereinafter, the interaction between the central process of a module and the four channel processes thereof (possibly five channel processes in the access module) will first be described. This is realized by means of the elementary operations "SEND" and "SELECT" to be defined hereinafter. In this respect, FIG. 9 shows a flowchart, at the instruction level, of the operation in two communicating modules in order to control the transmission of a message, notably as regards the transmitting module. FIG. 11a shows the same operations expressed in a higher programming language. Each module may contain more nodes; however, at the most one thereof is activated. A part of the local memory has to be reserved for each node. The case where the number of nodes to be locally implemented is larger than the number corresponding to the locally available memory will not be considered herein. For each locally implemented node there are present a number of pairs of Boolean variables (which are situated at predetermined locations in the local memory assigned to the node). The number of these pairs equals the sum of the number of partial tasks in which the task of an algorithm to be used can be split in accordance with the splitting program for non-local processing (this number thus equals two in the example of FIG. 3), plus the number of directions in which the result of the algorithm ultimately executed in the relevant module can be dispatched (this number again equals two in the example of FIG. 3). In principle said number of 2+2=4 may be larger (more than two partial tasks are formed) as well as smaller (the result formed is despatched in only one direction). The sending module itself determines the direction in which information is despatched. The part of Boolean variables comprises P and Q. Block 226 shows the start of a sending action. In block 230, the Boolean variable P associated with the relevant channel x is set to the value "1" in the sending module "N". In block 232 in Boolean variable Q associated with the relevant channel is directly set to "1" in the module N' which acts as the receiver. The indication on line 3 of FIG. 11a means that "action" and "operation" take place in two different modules; at the communication level, this means a non-synchronized operation where the operation indicated at this instant has to succeed unconditionally. In block 234 it is detected whether the Boolean variable Q associated with the relevant channel is "1" in the sending module. If this is not the case, process in the block 236 assumes a waiting state, while subsequently a different node, if present is activated in the relevant module. If several non-active nodes are present, the selection can be made, for example, by cyclic interrogation; this activation is symbolized in that block 234 comprises a second input from the activation block 238. Thus, a direct path can again be established from the block 238 to the block 236. If the relevant module contains only one process, the loop 234-236-238 is continuously completed. If the latter variable Q did have the value "1" in the foregoing, the communication operation is realized in block 242. When the message has been sent, the Boolean variable Q in the sending module is set to "0" in block 244 and the variable P in the sending module is set to "0" during the subsequent block 246. Finally, the relevant node is ready with the transport in block 249: it can perform other activities, for example starting a new communication procedure, processing the results present, or it can be de-activated.

Figures 10, 11B:
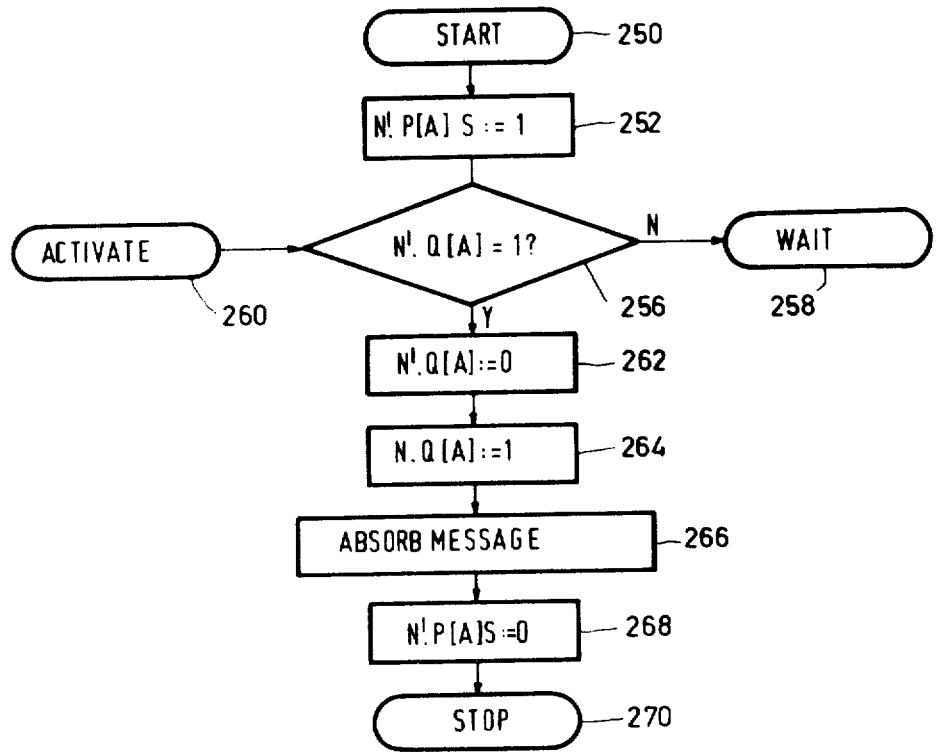

FIG. 10 similarly shows the flow-chart of the receiving module at the instruction level, and FIG. 11b shows the same operations expressed in a higher programming language. Block 250 indicates that the communication procedure is started. The receiving module necessarily knows via which channel data is to be received: for example, in the described embodiment if the result of one of the two partial tasks has been received, but the other not yet, and the result is always received along the same path as followed by the signals of the partial task to be performed when they were despatched. The latter is in principle not necessary; for example, it may be that the module tries to despatch the result "as quickly as possible", as long as it is via one of the two connections COML, COMU. The same may be applicable to the allocation of the partial tasks. This problem is relevant notably if the splitting process is not symmetrical, so that the number of partial tasks increases more than linearly per splitting level. In such cases, and also if, for example, at least two further results have to be received, it is not known via which connection the result will be received. Thus, in block 252 of all channels along which a message can be received the Boolean variable P is set to "1" in the receiving module (N'). In block 256 it is detected whether the Boolean variable Q in the receiving module of any channel intended in block 252 is "1": see block 232. If this is not so, the relevant process assumes a waiting state in the block 258, while subsequently another node is activated in the relevant module. Such an activation of a (receiver) node is symbolized by the block 260. It is to be noted that in one and the same module receiver nodes as well as transmission nodes can be activated. If more than one "1" was detected in the foregoing, one is selected therefrom in known manner. If only one "1" is detected, or chosen, it means that one transmission node is known which desires communication (see FIG. 10, block 232). Subsequently, in block 262 the variable Q of the relevant detected or selected channel in the receiver node is made qual to "0". Subsequently, in block 264 the variable Q of the relevant channel is made "1" in the transmitting module. This is again in operation where "action" and "operation" take place in two different modules. In block 266, the receiver node receives the message concerning the connection thus selected, and subsequently the message is absorbed, for example, it is stored in a memory location of the part of the memory assigned to the node active at the relevant instant. At the end of the message, in block 268 all Boolean variables P of the receiving module which were made "1" in block 252 are reset to "0". In block 270 the communication procedure is terminated. Subsequently, different procedures can be started again (processing of results, further communication, activation of a further node), as described for the transmitting module. This completes the description of what is indicated in FIG. 4 as an "S" and an "R" operation. A message contains the following two fields:

a. a binary quantity, a first value of which indicates that the content of the message means an operation on a variable Q, as discussed with reference to FIGS. 9, 10. The second value of this binary quantity indicates that the content of the message does not mean such an operation.

b. a multi-bit quantity which, when the message implies an operation on a variable Q, indicates the pair of names of the sending and receiving nodes. When the relevant message does not imply an operation on a Boolean variable Q this multi-bit quantity contains an information for the node active in the receiving module at this instant. This information may notably be a parameter quantity.

Switching over to another node in FIGS. 9, 10 takes place if the relevant Boolean variable (variables) Q of the node active at this instant is (are) "0" i.e. "untrue" during the "waiting" instruction. The next one of the further nodes in the relevant module for which at least one pair of associated Boolean variables P, Q both have the value 1 is then treated. When a node is activated, a number of relevant quantities thereof are stored in reserved registers of the module. When a node is deactivated, the contents of these registers are restored into the reserved memory locations of the part of the memory of the relevant module assigned to the relevant node. This is a conventional technique. The searching in the described organization, therefore, always continues until a new node to be activated is found.

Hereinafter the interaction between the channel processes of a module and the central process. FIG. 11c shows a channel process. The four physical channels (U, D, R, L) are symbolized by the ir index "x". The communication with a neighbouring module is controlled each time in handshake by means of two Boolean variables a, b and a buffer BUF. The handshake is a version of that previously described in U.S. Pat. No. 4,357,658, assigned to the assignee of this application, which is incorporated herein by way of reference. In view of the organization with semiduplex connections between the various modules, the buffer BUF is used in two directions; the buffer has enough storage capacity for the described two fields of a message. Furthermore, each channel process CP (x) uses two Boolean semaphore quantities i1(x) and i2(x) for data input and one Boolean semaphore quantity 01(x) for data output which are stored again in relevant register positions in a conventional manner. It is assumed that the channel process CP (x) starts with a sending operation. The opposite channel of a pair (U/D; R/L) should then start a receive operation. FIG. 11c shows the program in higher programming language. If a $\neq$ b, the relevant channel process can send; if a=b, it can receive. Parentheses indicate a comment: line 5 indicates that a message has arrived in BUF (x) which implies an operation on a variable Q: field f1. Line 6 indicates that the second field (f2) of the buffer contains the identity of the addressed node. The identity implicitly allocates two addresses y, z of the available storage space (line 7). If the address z has a predetermined, specific value which is denoted by a star, it is a "new" node for which storage space is reserved at the memory address "y". "y" is a relative address value, so the next element of the segment table which is free: the allocated space suffices for the node; the space required is provided by the previously described main program. However, if no new node is concerned (denoted by a rectangle), nothing happens (skip). Subsequently, if a new node is concerned, a quantity M on line 11 is made equal to 1, q being a displacement address quantity within the node, the amount of storage space required per node being indicated by $\Delta$.

Line 12 forms the pendant of line 5: the message then concerns a parameter value. In that case the channel process waits until the node active at this instant can accept the received parameter value. Line 13 indicates that this is performed by means of conventional p and v operations; this will be described hereinafter with reference to FIG. 11d. Line 14 indicates that the buffer may be empty, which is indicated by "NIL". Obviously, nothing happens in that case. On line 16 the variable a is inverted and subsequently there is a waiting period until the variables a and b are equal (pendant of line 03). This is followed by the list for a send operation which starts with a p-operation on the Boolean variables "01(x)". On line 18 it is checked whether the variable "full" is true, indicating that the node active at this instant has indeed stored data to be sent in the buffer. If this quantity is "true", it is reset. Subsequently, the variable "a" is inverted and the process waits until the variables a and b are unequal. If this is so (v-operation), the relevant process may continue. The line 20 indicates that, if "full" is untrue, the buffer is filled with a dummy message NIL; this is the case when the central process has no message to be sent. Line 21 is then equal to line 19. Finally, the lines 22, 23 show the termination of the procedure.

The communication between the channel process CP(x) and the central process of the same module takes place by means of one of the three procedures shown in the FIGS. 11d, e, f. FIG. 11d shows the procedure for the reception of a message. This message is characterized by a length l (number of bytes), a starting address A in the memory, said starting address being produced in the central process, and a channel name x. Line 2 defines a running variable. Via p and v-operations on line 3, the content of the buffer is transferred to the memory. After updating of the address counting quantity, the loop is completed. Finally, the procedure on lines 5, 6 is terminated.

Similarly, FIG. 11e shows the procedure for the sending of a message, this message being intended for the node active in the receiving module so that it contains only a quantity of parameter signals. On line 5 a Boolean variable is made "true" to indicate that the relevant module, i.e. also the relevant node, has a message to be sent. This Boolean variable "full" is used in FIG. 11c. Therefore, on line 4, first the associated communication buffer was filled with the parameter signal and the starting address. The loop is also completed a number of times until the current address 11 corresponds to the length quantity 1. Each time a v-operation on the quantity 01(x) is used. Therefore, the FIGS. 11d and 11e are quite similar.

Similarly, FIG. 11f shows the procedure for the filling of the buffer with a signal which is intended for a possibly active node, but possibly also for a node to be activated at a later stage. For example, using the previously described rules, first the identification of the node for which the message is intended is calculated on line 2 from the identification of the origin node. Subsequently, using a p-operation on the Boolean variable 01(x), the buffer is filled, the content of the first field of the message thus containing the activation indication. Subsequently, the Boolean variable "full" is set to 1 and the procedure is terminated by way of a v-operation on 01(x).

It is also to be noted that, thanks to the loop operation in FIG. 11d, the sending of a parameter takes place directly from the memory of the sending module to the memory of the receiving module. Thus, there will be no problems arising from congestion due to mutually conflicting message paths. The reset signal (see above) resets all quantities 01 to "1" and all quantities i 1, i2 to "0".

Figure 12:
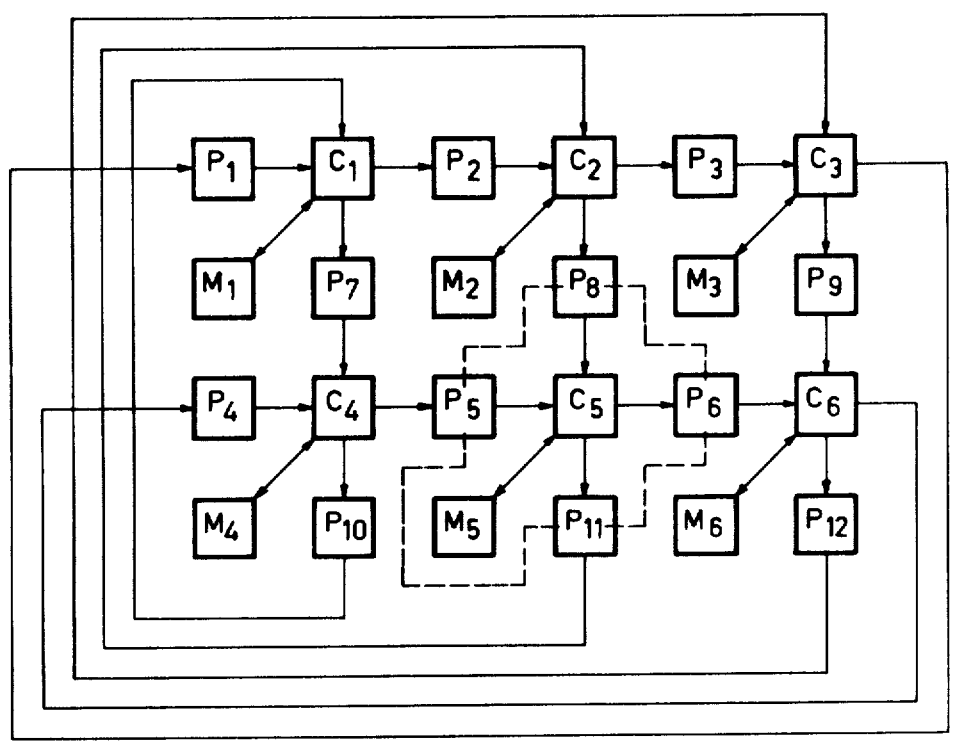
FIG. 12 shows a modified inter-module organization.

FIG. 12 shows a further modified inter-module organization. The array shown comprises twelve processing units (P1 through P12), six memory control elements (C1 through C6) and six memories (M1 through M6). Each memory is linked one-to-one to a memory control element. Each memory control element is connected to its proper memory and to four neighboring processing units. Now, if, for example, processing unit P8 received an activation signal annex parameter signal for a task, it may (if the task is not elementary) split this task into two parts, and forward the corresponding activation signals and parameter signals to reserved memory segments in the memory M5 under control of memory control element C5. The latter solves priority problems occurring due to two or more requests arriving there from any of the neighboring processing units P5, P6, P8, P11. The partial task may now be fetched by the processor P6 or P11 in dependence of the location of the memory segments where the task was stored; each processor accesses only its "own" segment. Thus, the union of memory M5, memory control unit C5 plus processors P5, P6, P8, P11 constitutes a "module" according to the definitions given herebefore. The fact that all processors form part of two different "modules" is represented by the broken line which includes only a part of each processor as being inside the module.

A further concept in the arrangement of FIG. 12 is that a "module" consists of a memory such as M5, the corresponding control element, such as C5, and two processing units, such as P6 and P11 that receive their data from the memory. Except for the handling of memory accesses by the memory control element and the presence of two processing units per module, the set up is now identical to the one considered with respect to earlier figures.

What is claimed is:

1. A multiprocessor computer system for executing a recursive algorithm on input data, comprising a plurality of at least six modules which at least substantially fill a functional array of modules of p(p>3) functional rows and n(n>2) functional columns, wherein each module has a uniform cycle of m(−4>m>3) array connections, namely a first column-wise and a first row-wise array connection for receiving a first activation signal and first parameter data for the execution of an algorithm and sending a first result signal after executing said algorithm on said first parameter data, wherein each module has a processor element (300), a program memory (302), data memory, and interconnection means for interconnecting said processor element, program memory, data memory and array connections; means for executing, in each module upon reception of said first activation signal, a recursion procedure step in said algorithm to produce first and second activation signals associated with second parameter data for the execution of said algorithm and to combine second results of executing the algorithm on said second parameter data upon completion of said second results, or, as the case may be, to execute an elementary procedure when said first data are elementary data, said combining or elementary procedure producing said first result, said uniform cycle furthermore comprising a second row-wise and second column-wise array connection for sending first and second activation signals associated with first and second parameter data for the execution of said algorithm, and means to receive respective second result signals of executing said algorithm on said second parameter data, at least one of said modules constituting an access module of the entire array and comprising a further connection for receiving an external activation signal and external parameter data for said algorithm and for sending an external result signal of executing said algorithm on said external parameter data, wherein any non-first module of an array row has its first row-wise connection attached to the second row-wise connection of the preceding module of the row, and while the first module of any array row has its first row-wise connection attached to the second row-wise connection of the last module of its respective row, wherein any non-first module of an array column has its first columnwise connection attached to the second columnwise connection of the preceding module of that array column, and while the first module of any array column has its first columnwise connection attached to the second columnwise connection of the last module of its respective column.

2. A multiprocessor computer system as claimed in claim 1, wherein the second row-wise connection of the last module of row (1 . . . p) is attached to the first row-wise connection of the first module of row (i+1, j+2 . . . p, 1, 2 . . . j), and the second column-wise connection of the last module of column (1, 2 . . . n) is attached to the first column-wise connection of the first module of column (k+1, k+2 . . . n, 1, . . . k), where j is not larger than p and k is not larger than n.

3. A multiprocessor computer system as claimed in claim 2, characterized in that the first destination connections of the last modules of the rows (1 . . . p) are connected to the first source connections of the first modules of the rows (j+1, j+2, . . . p, 1 . . . j) respectively and the second destination connections of the last modules of the columns (1, 2, . . . , n) are connected to the second source connections of the first modules of the columns (k+1, k+2, . . . n, 1 . . . k).

4. A multiprocessor computer system wherein each module comprises means for starting and stopping respective algorithm nodes upon reception of respective primary activation signals as claimed in claims 2 or 3, characterized in that each message formed therein by a central process, said indication having a first value which indicates that the message acts exclusively as a parameter data message for the node active in a receiving module, and a second value which indicates that the message acts exclusively as an activation message for the node in a receiving module which is identified by way of a signal incorporated in the body of the message.

5. A multiprocessor system as claimed in claim 4, further including means to establish a communication path under the control of said first value between two parts of the memories of the associated modules then assigned to two communicating nodes.

6. A multiprocessor computer system as claimed in claim 2 or 3 characterized in that p=n.

7. A multiprocessor computer system as claimed in claims 2 or 3, characterized in that each module comprises means for separately implementing a central process and channel process for each said connection thereof, and means for making said central process communicate exclusively with the channel processes of the relevant module, the channel processes realizing the entire communication between the various modules, the splitting of the task, the combining of the results of the partial tasks and the execution of an elementary partial task being performed entirely by the central process.

8. A multiprocessor computer system as claimed in claims 2 or 3, in which each time two interconnected modules are coupled by way of a pair of channel processors in a handshake, characterized in that each of such coupled channel processors comprises:

(g) first signalling means (P(x)) for the signalling per said connection, by way of a first state (1), to a further module of a despatch of a message desired by said first module via said connection, or the reception thereof, a second state (0) of said means acting, with the exclusion of further states, as a rest state after the completion of said despatch or reception;

(h) second signal means (Q(x)), having a first state (1) in order to be set itself to said first state in the case of a despatch desired by another module via said connection after the formation therein of the first state of said first signalling means, and a second state (0) which acts as an active state (262) after the detection (256) of the latter first state and in order to be set itself to the first state (264) in the case of reception desired by another module via said connection after the formation of the latter "active" state by said other module, the second state acting as a rest state (244) after the completion of said reception.

9. A multiprocessor computer system as claimed in claims 2 or 3, wherein each module comprises a centralized memory means, which is accessible directly from a plurality of processor means, each of said processor means constituting a respective interface processor or a respective node of said m array connections of the relevant module, each interface processor being an accessory device of the two centralized memory means of the modules interconnected by the array correction in question.

10. A multiprocessor computer system as claimed in claim 2, characterized in that the array comprises (n×p) modules, k being 0 and the numbers (p+j) and n not having a common factor.

* * * * *